United States Patent
Chen (10) Patent No.: US 8,894,090 B1
(45) Date of Patent: Nov. 25, 2014

(54) STROLLER WITH FOLDABLE STRUCTURE

(71) Applicant: Way-Hong Chen, Taipei (TW)

(72) Inventor: Way-Hong Chen, Taipei (TW)

( * ) Notice: Subject to any disclaimer, the term of this patent is extended or adjusted under 35 U.S.C. 154(b) by 0 days.

(21) Appl. No.: 14/072,928

(22) Filed: Nov. 6, 2013

(51) Int. Cl.
*B62B 7/08* (2006.01)

(52) U.S. Cl.
USPC ......... 280/647; 280/642; 280/658; 280/47.38

(58) Field of Classification Search
USPC ........... 280/642, 42, 647, 649, 650, 657, 658, 280/47.34, 47.35, 47.38
See application file for complete search history.

(56) References Cited

U.S. PATENT DOCUMENTS

| | | | |
|---|---|---|---|
| 8,113,534 B2* | 2/2012 | Cheng | 280/649 |
| 8,186,706 B2* | 5/2012 | Dotsey | 280/647 |
| 8,408,580 B2* | 4/2013 | Liao | 280/642 |
| 8,651,511 B2* | 2/2014 | Chen et al. | 280/642 |
| 2005/0242548 A1* | 11/2005 | Hutchinson et al. | 280/642 |
| 2012/0319382 A1* | 12/2012 | Lin | 280/647 |
| 2013/0009388 A1* | 1/2013 | Funakura | 280/650 |
| 2013/0221636 A1* | 8/2013 | Driessen | 280/650 |

\* cited by examiner

*Primary Examiner* — John Walters
(74) *Attorney, Agent, or Firm* — Alan Kamrath; Kamrath IP Lawfirm, P.A.

(57) ABSTRACT

A stroller includes an outer frame unit, two support units connected with the outer frame unit, two linking units connected with the outer frame unit and the support units, a cross connection unit mounted between the support units and the linking units, and a positioning and folding unit mounted between the support units. Thus, the positioning and folding unit is operated to expand and collapse the stroller.

7 Claims, 12 Drawing Sheets

STROLLER WITH FOLDABLE STRUCTURE

BACKGROUND OF THE INVENTION

1. Field of the Invention

The present invention relates to a stroller and, more particularly, to a stroller with a foldable structure.

2. Description of the Related Art

A conventional foldable stroller comprises a main frame, a wheel unit mounted on the main frame, and a folding device mounted on the main frame. Thus, the folding device is operated to fold the main frame so as to collapse the stroller. However, after the stroller is folded, the main frame is contracted inward without having a protruding handle for grip of a user's hand, so that the user cannot hold and carry the stroller easily and conveniently, thereby causing inconvenience to the user. In addition, the stroller has a greater height after being collapsed, thereby causing inconvenience in packaging, storage and transportation of the folded stroller.

BRIEF SUMMARY OF THE INVENTION

In accordance with the present invention, there is provided a stroller comprising an outer frame unit, two support units connected with the outer frame unit, two linking units connected with the outer frame unit and the support units, a cross connection unit mounted between the support units and the linking units, and a positioning and folding unit mounted between the support units. Each of the support units includes a connecting piece, a rear leg having a first end mounted on the connecting piece, and a rear wheel mounted on a second end of the rear leg. The connecting piece of each of the support units is provided with two first connecting grooves and a second connecting groove. The outer frame unit includes an upper frame having two opposite ends each pivotally connected with the respective first connecting groove of each of the support units, a lower frame having two opposite ends each pivotally connected with the respective first connecting groove of each of the support units, a side frame pivotally connected with the upper frame, and a front wheel mounted on the lower frame. Each of the linking units includes a connecting block mounted on the rear leg of the respective support unit, an upper curved lever mounted between the connecting block and the upper frame of the outer frame unit, a lower curved lever mounted between the connecting block and the lower frame of the outer frame unit, and a support bar connected with the connecting block. The connecting block of each of the linking units is provided with a mounting hole, two first connecting recesses, a second connecting recess and a connecting portion. The mounting hole of each of the linking units is slidably mounted on the rear leg of the respective support unit. The upper curved lever of each of the linking units has a first end pivotally connected with the respective first connecting recess of the connecting block and a second end pivotally connected with the respective end of the upper frame of the outer frame unit. The lower curved lever of each of the linking units has a first end pivotally connected with the respective first connecting recess of the connecting block and a second end pivotally connected with the respective end of the lower frame of the outer frame unit. The support bar of each of the linking units is connected with the connecting portion of the connecting block. The cross connection unit includes two oblique levers intersecting each other, and two rotation members each mounted on the respective oblique lever. The rotation members of the cross connection unit are pivotally connected with each other. Each of the oblique levers of the cross connection unit has a first end pivotally connected with the second connecting groove of the respective support unit and a second end pivotally connected with the second connecting recess of the respective linking unit. The positioning and folding unit includes a folding base, a compression spring, a control cover, two first pins, a second pin, two folding bars, and two positioning protrusions. The folding base of the positioning and folding unit is provided with a receiving chamber, two elongate slots and a mounting channel. The control cover of the positioning and folding unit is movably mounted on the folding base. Each of the first pins of the positioning and folding unit is extended through the control cover and is slidably mounted in the respective elongate slot of the folding base. The second pin of the positioning and folding unit is extended through the control cover and is slidably mounted in the receiving chamber of the folding base. The compression spring of the positioning and folding unit is mounted in the receiving chamber of the folding base and is biased between the folding base and the second pin. Each of the folding bars of the positioning and folding unit has a first end pivotally mounted in the mounting channel of the folding base and a second end pivotally connected with the connecting block of the respective linking unit. Each of the positioning protrusions of the positioning and folding unit is formed on the first end of the respective folding bar and is provided with a positioning groove and a plurality of engaging teeth. The positioning groove of each of the positioning protrusions is detachably locked onto the respective first pin. The engaging teeth of the positioning protrusions mesh with each other. The stroller further comprises a handle unit connected with the support units.

According to the primary advantage of the present invention, the handle unit protrudes outward after the stroller is folded to facilitate the user holding and carrying the folded stroller.

According to another advantage of the present invention, the upper frame and the lower frame of the outer frame unit are collapsed and juxtaposed after the stroller is folded to reduce the height of the folded stroller.

According to a further advantage of the present invention, the user only needs to pull the control cover so as to contract and fold the stroller so that the stroller is collapsed easily and quickly.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-8, a stroller in accordance with the preferred embodiment of the present invention comprises an outer frame unit 1, two support units 2 connected with the outer frame unit 1, two linking units 3 connected with the outer frame unit 1 and the support units 2, a cross connection unit 4 mounted between the support units 2 and the linking units 3, and a positioning and folding unit 5 mounted between the support units 2.

The support units 2 are located symmetrically at two opposite sides of the outer frame unit 1. Each of the support units 2 includes a connecting piece 21, a rear leg 25 having a first end mounted on the connecting piece 21, and a rear wheel 26 mounted on a second end of the rear leg 25. The connecting piece 21 of each of the support units 2 has a substantially T-shaped profile and is provided with two first connecting grooves 22 and a second connecting groove 24. The first connecting grooves 22 of each of the support units 2 are located at two opposite sides of the connecting piece 21. The connecting piece 21 of each of the support units 2 has a side provided with a socket 23. The socket 23 of each of the support units 2 has a side provided with a locking hole 231.

The outer frame unit 1 includes an upper frame 11 having two opposite ends each pivotally connected with the respective first connecting groove 22 of each of the support units 2, a lower frame 13 having two opposite ends each pivotally connected with the respective first connecting groove 22 of each of the support units 2, a side frame 12 pivotally connected with the upper frame 11, and a front wheel 14 mounted on the lower frame 13. Each of the upper frame 11, the lower frame 13 and the side frame 12 of the outer frame unit 1 has a substantially U-shaped profile. The upper frame 11 of the outer frame unit 1 is provided with two bendable joints 111 which can be bent freely. The upper frame 11 and the lower frame 13 of the outer frame unit 1 construct a substantially rectangular structure. The lower frame 13 of the outer frame unit 1 is provided with two bendable joints 131 which can be bent freely. The side frame 12 of the outer frame unit 1 has two opposite ends pivotally connected with the two opposite ends of the upper frame 11 so that the side frame 12 is pivoted freely relative to the upper frame 11 to form a determined angle between the side frame 12 and the upper frame 11. The front wheel 14 of the outer frame unit 1 is located between the bendable joints 131 of the lower frame 13.

The linking units 3 are located symmetrically at the two opposite sides of the outer frame unit 1 and are located under the support units 2. Each of the linking units 3 includes a connecting block 31 mounted on the rear leg 25 of the respective support unit 2, an upper curved lever 34 mounted between the connecting block 31 and the upper frame 11 of the outer frame unit 1, a lower curved lever 35 mounted between the connecting block 31 and the lower frame 13 of the outer frame unit 1, and a support bar 38 connected with the connecting block 31. The connecting block 31 of each of the linking units 3 has a substantially U-shaped profile and is located under the connecting piece 21 of the respective support unit 2. The connecting block 31 of each of the linking units 3 is provided with a mounting hole 32, two first connecting recesses 33, a second connecting recess 36 and a connecting portion 37. The first connecting recesses 33 of each of the linking units 3 are located at two opposite sides of the connecting block 31. The connecting portion 37 of each of the linking units 3 is under the second connecting recess 36. The connecting block 31, the upper curved lever 34 and the lower curved lever 35 of each of the linking units 3 construct a substantially U-shaped structure. The mounting hole 32 of each of the linking units 3 is slidably mounted on the rear leg 25 of the respective support unit 2 so that the connecting block 31 of each of the linking units 3 is slidable on the rear leg 25 of the respective support unit 2. The upper curved lever 34 of each of the linking units 3 has a substantially arcuate shape and has a first end pivotally connected with the respective first connecting recess 33 of the connecting block 31 and a second end pivotally connected with the respective end of the upper frame 11 of the outer frame unit 1. The lower curved lever 35 of each of the linking units 3 has a substantially arcuate shape and has a first end pivotally connected with the respective first connecting recess 33 of the connecting block 31 and a second end pivotally connected with the respective end of the lower frame 13 of the outer frame unit 1. The support bar 38 of each of the linking units 3 has a substantially L-shaped profile and is connected with the connecting portion 37 of the connecting block 31.

The cross connection unit 4 is pivotally connected with the support units 2 and the linking units 3 and includes two oblique levers 41 intersecting each other to form a substantially X-shaped link, and two rotation members 42 each mounted on a mediate portion of the respective oblique lever 41. The rotation members 42 of the cross connection unit 4 are pivotally connected with each other so that the oblique levers 41 are pivotable about the rotation members 42. Each of the oblique levers 41 of the cross connection unit 4 has a first end pivotally connected with the second connecting groove 24 of the respective support unit 2 and a second end pivotally connected with the second connecting recess 36 of the respective linking unit 3.

The positioning and folding unit 5 includes a folding base 51, a compression spring 52, a control cover 53, two first pins 54, a second pin 58, two folding bars 55, and two positioning protrusions 56. The folding base 51 of the positioning and folding unit 5 is connected between the folding bars 55 and is provided with a receiving chamber 511, two elongate slots 512 and a mounting channel 513. The mounting channel 513 of the folding base 51 is under the receiving chamber 511. The folding base 51 of the positioning and folding unit 5 has a side provided with a drive plate 514 located beside the mounting channel 513 to facilitate a user driving the folding base 51. The control cover 53 of the positioning and folding unit 5 is movably mounted on the folding base 51. Each of the first pins 54 of the positioning and folding unit 5 is extended through the control cover 53 to move in concert with the control cover 53 and is slidably mounted in the respective elongate slot 512 of the folding base 51. The second pin 58 of the positioning and folding unit 5 is extended through the control cover 53 to move in concert with the control cover 53 and is slidably mounted in the receiving chamber 511 of the folding base 51. The compression spring 52 of the positioning and folding unit 5 is mounted in the receiving chamber 511 of the folding base 51 and is biased between the folding base 51 and the second pin 58. Each of the folding bars 55 of the positioning and folding unit 5 is pivotally connected between the folding base 51 and the respective linking unit 3 and has a first end pivotally mounted in the mounting channel 513 of the folding base 51 and a second end pivotally connected with the connecting block 31 of the respective linking unit 3. The second end of each of the folding bars 55 is located beside the second connecting recess 36 of the respective linking unit 3. Each of the positioning protrusions 56 of the positioning and folding unit 5 is formed on the first end of the respective folding bar 55 and is pivotable in the mounting channel 513. Each of the positioning protrusions 56 of the positioning and folding unit 5 is provided with a positioning groove 561 and a plurality of engaging teeth 57. The positioning groove 561 of each of the positioning protrusions 56 is detachably locked onto the respective first pin 54. The engaging teeth 57 of the positioning protrusions 56 mesh with each other.

The stroller further comprises a handle unit 6 connected with the support units. The handle unit 6 includes a handle 61, and two plugs 62 mounted on two opposite ends of the handle 61. The handle 61 of the handle unit 6 has a substantially inverted U-shaped profile and is provided with two bendable joints 611 which can be bent freely. Each of the plugs 62 of the handle unit 6 is inserted into the socket 23 of the respective support unit 2 and has a side provided with an elastic locking boss 621 detachably locked in the locking hole 231 of the respective support unit 2.

Figure 1:
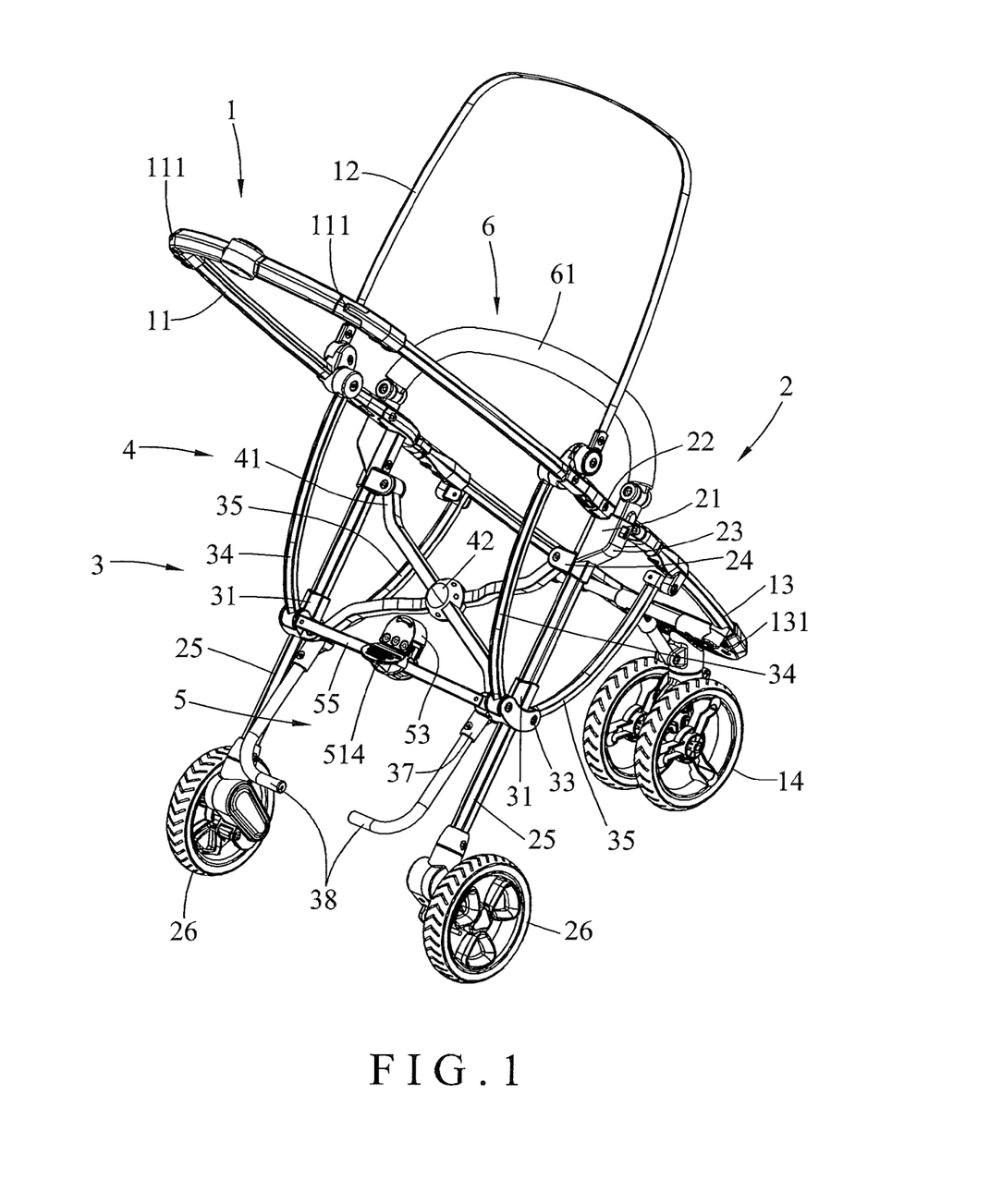
FIG. 1 is a perspective view of a stroller in accordance with the preferred embodiment of the present invention.
Figure 2:
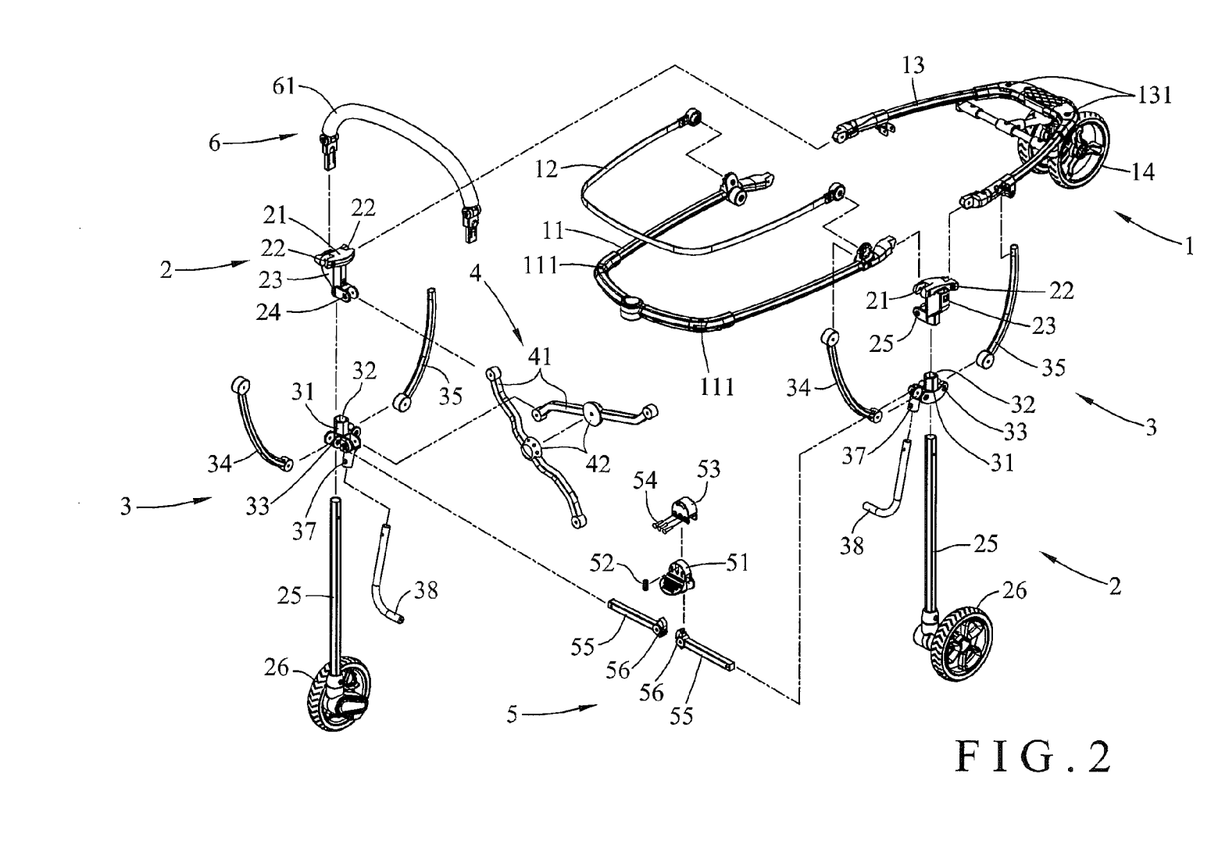
FIG. 2 is an exploded perspective view of the stroller as shown in FIG. 1.
Figure 3:
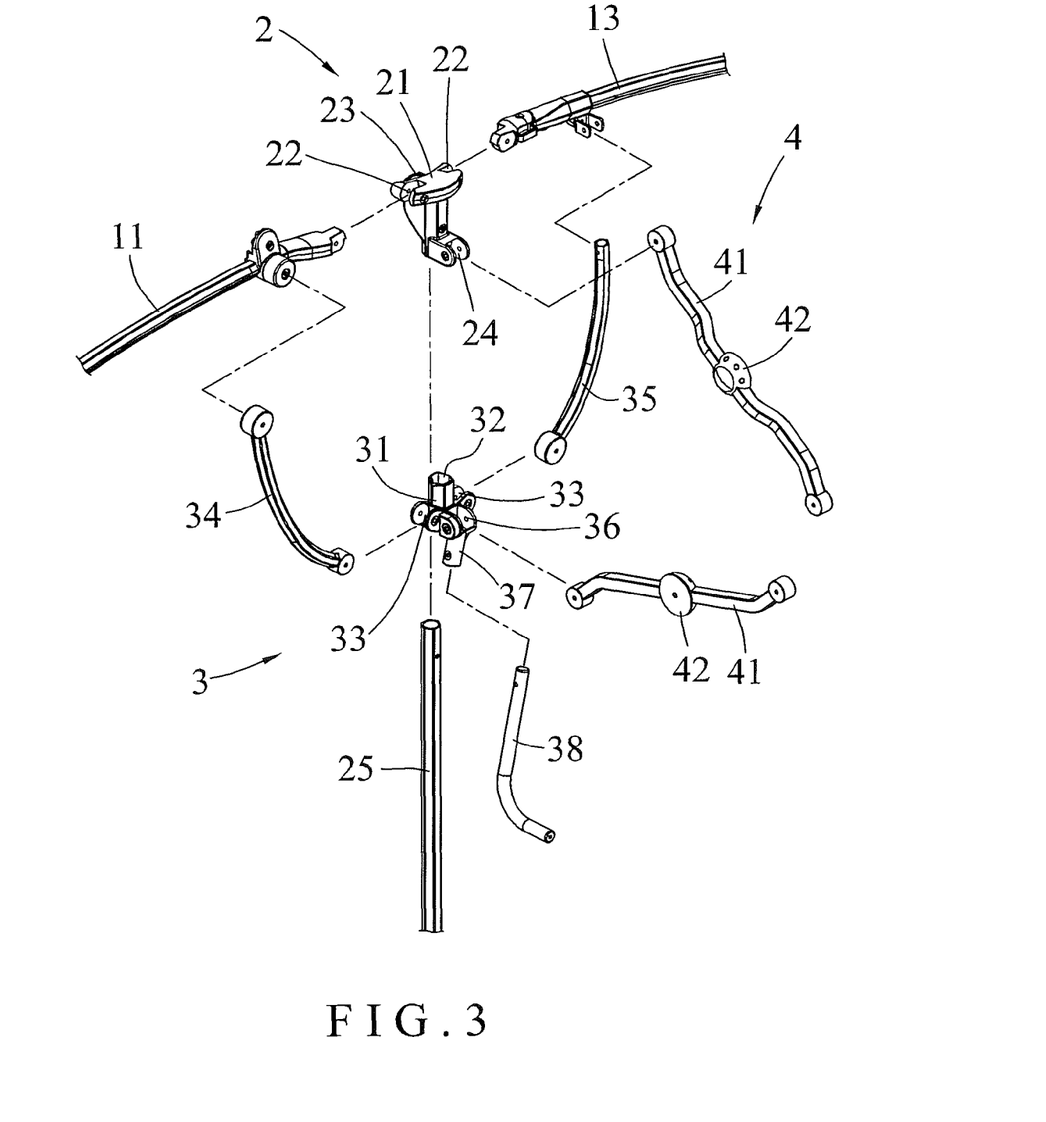
FIG. 3 is a partially exploded perspective view of the stroller as shown in FIG. 1.
Figure 4:
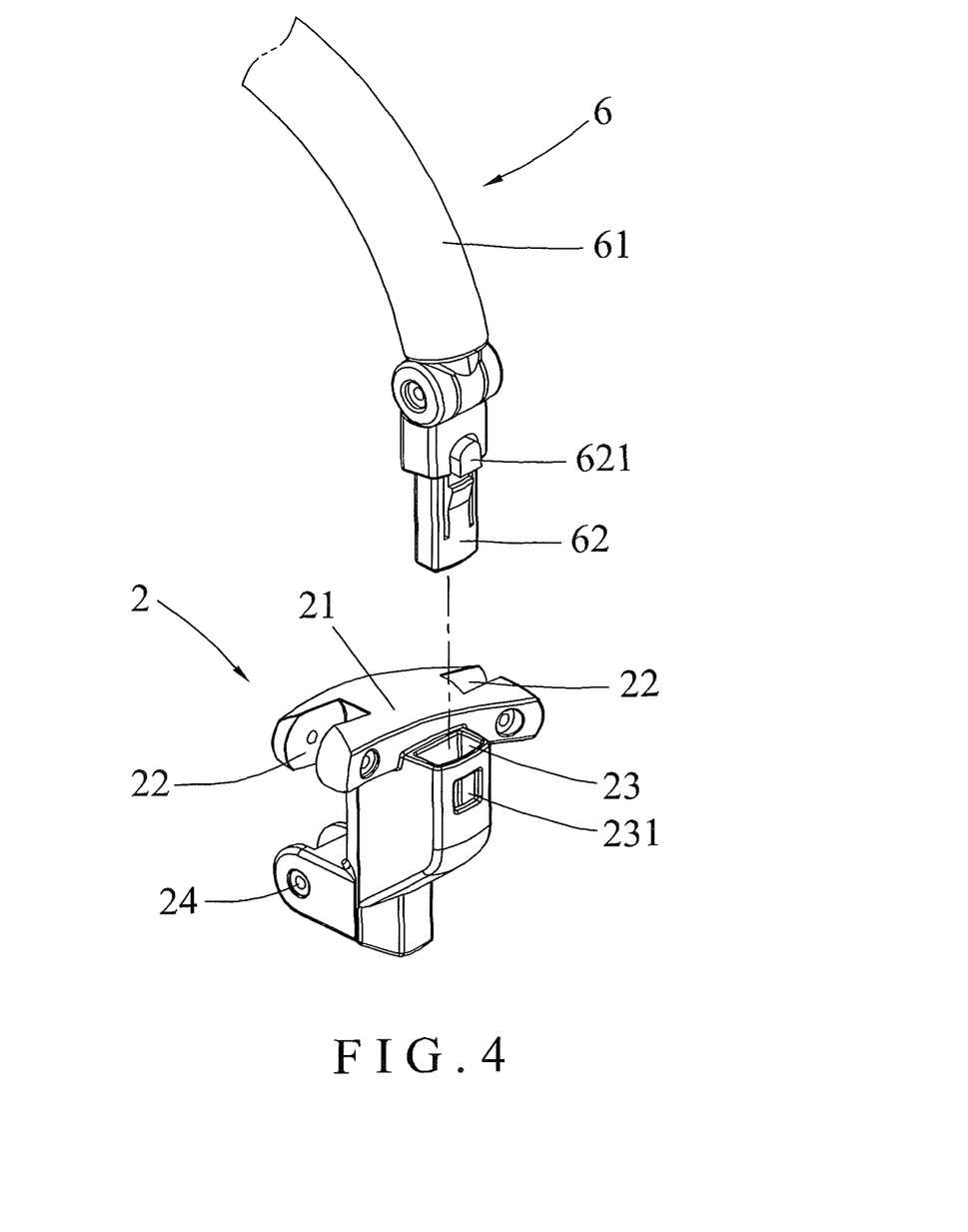
FIG. 4 is a partially exploded perspective view of the stroller as shown in FIG. 1.
Figure 5:
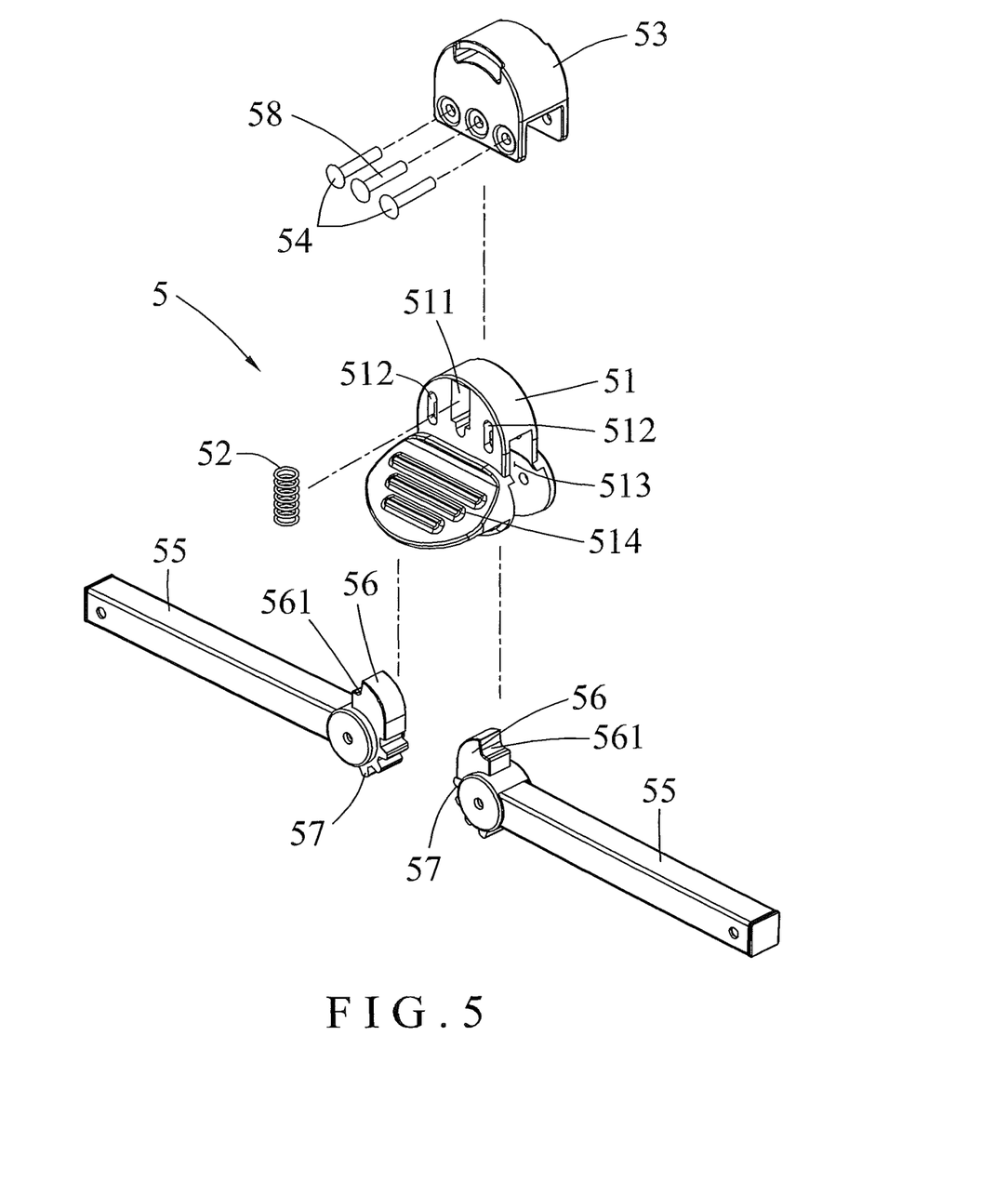
FIG. 5 is a partially exploded perspective view of the stroller as shown in FIG. 1.
Figure 6:
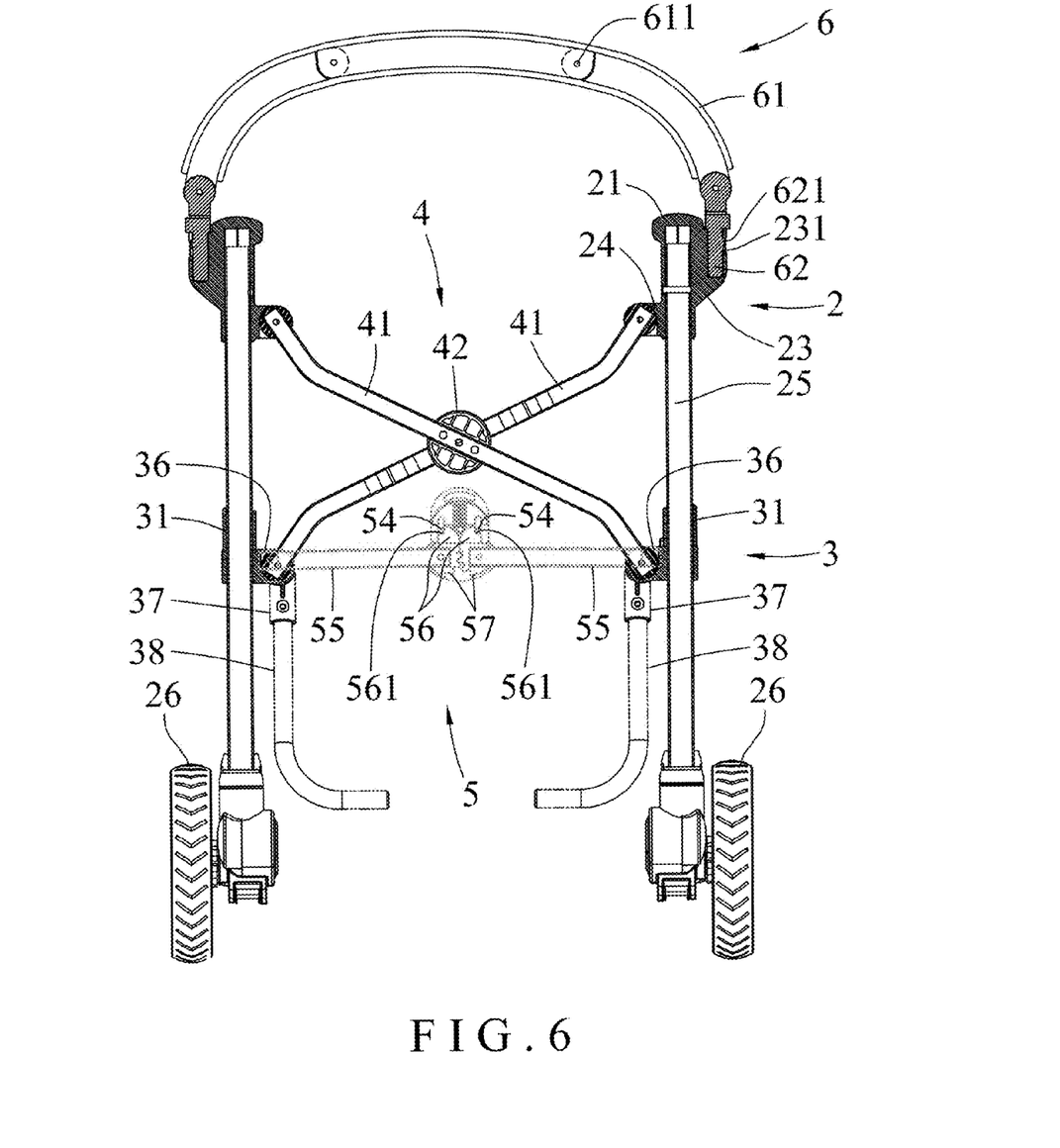
FIG. 6 is a plan cross-sectional view of the stroller as shown in FIG. 1.
Figure 7:
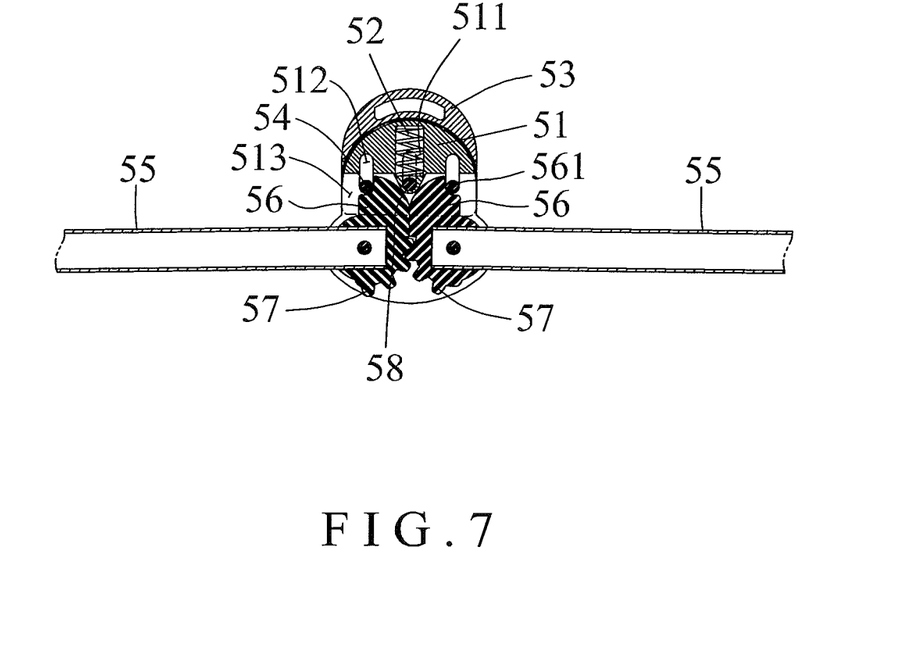
FIG. 7 is a partially plan cross-sectional view of the stroller as shown in FIG. 1.

As shown in FIGS. 1-7, the second pin 58 is pressed downward by the compression spring 52 to move down the control cover 53 which drives the first pins 54 so that the first pins 54 are moved downward and are positioned in the positioning groove 561 of each of the positioning protrusions 56 as shown in FIG. 7 so as to position the folding bars 55 in place. In such a manner, the folding bars 55 are locked and disposed at a horizontal state to extend the linking units 3 and the support units 2 so that the stroller is expanded as shown in FIG. 1. At this time, the cross connection unit 4 is also extended outward as shown in FIG. 6.

Figure 8:
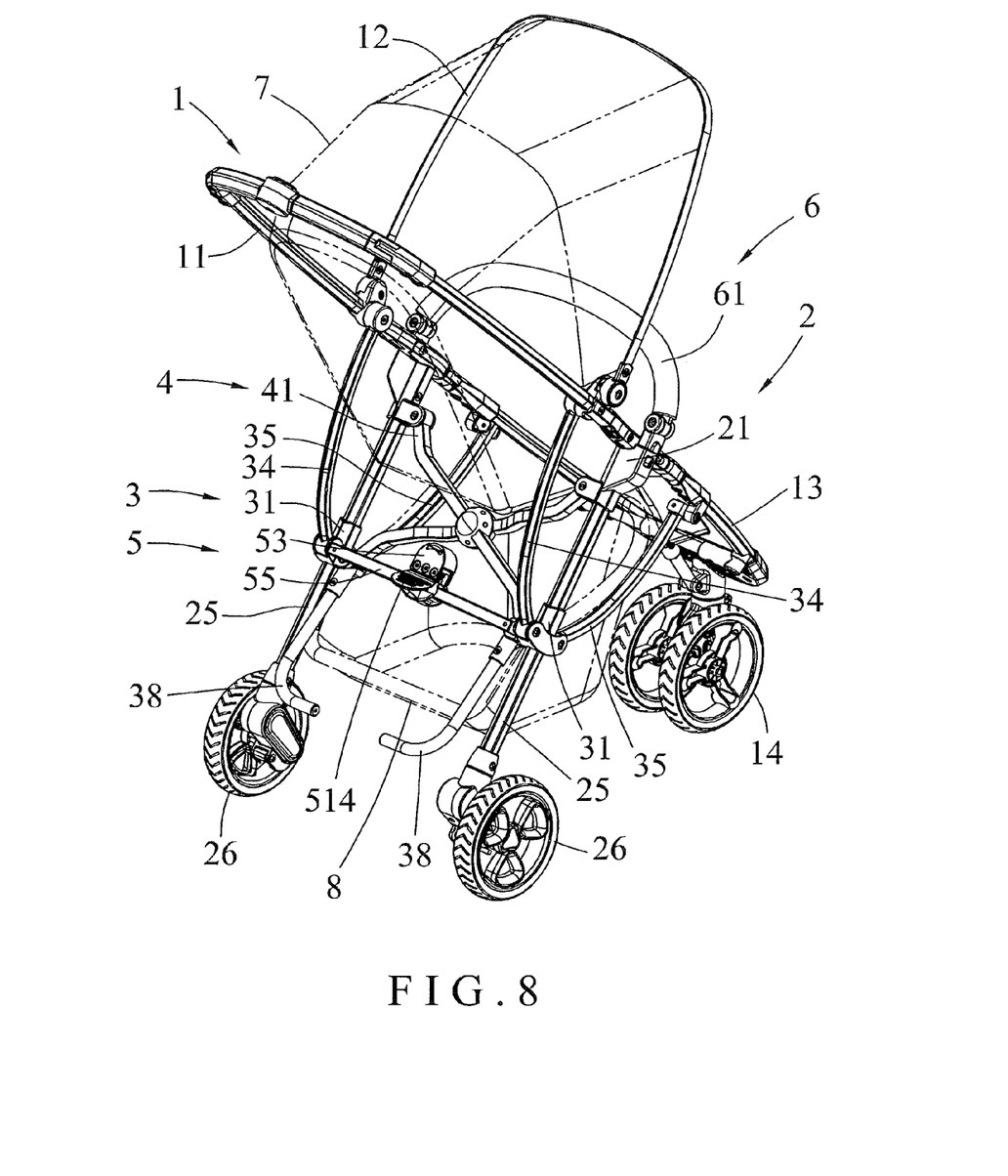
FIG. 8 is a perspective view of a stroller in accordance with another preferred embodiment of the present invention.

As shown in FIG. 8, the stroller further comprises a seat enclosure 7 mounted on the outer frame unit 1 and located between the upper frame 11, the side frame 12 and the lower frame 13 for placing a baby, and a placement basket 8 mounted between the linking units 3 and connected with the lower curved lever 35 and the support bar 38 for placing articles.

Figure 9:
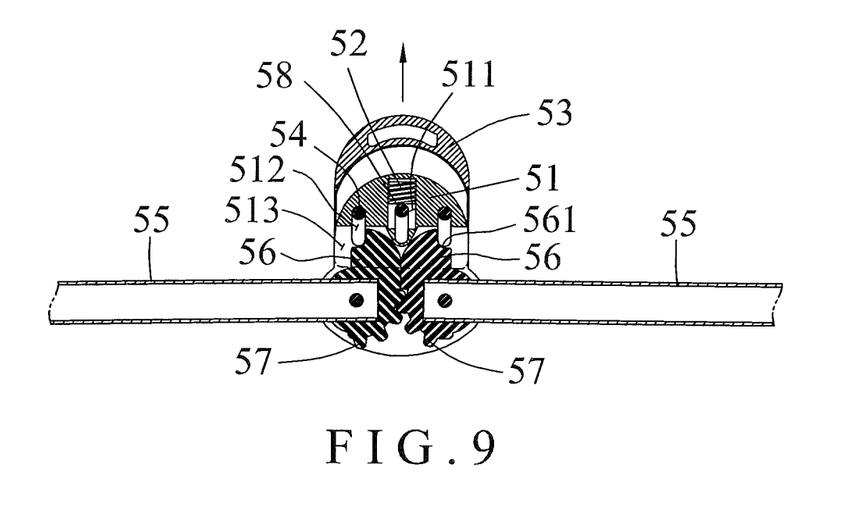
FIG. 9 is a schematic operational view of the stroller as shown in FIG. 7.
Figure 10:
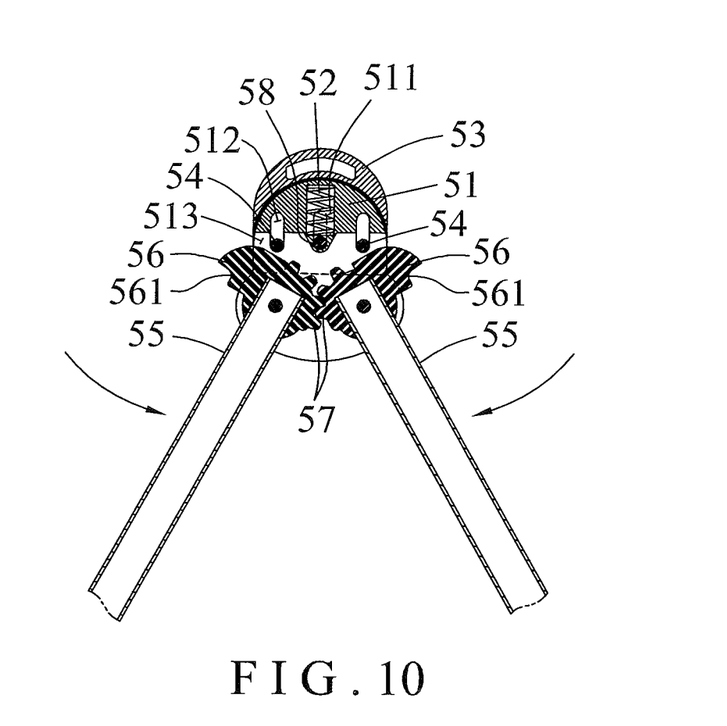
FIG. 10 is a schematic operational view of the stroller as shown in FIG. 9.
Figure 11:
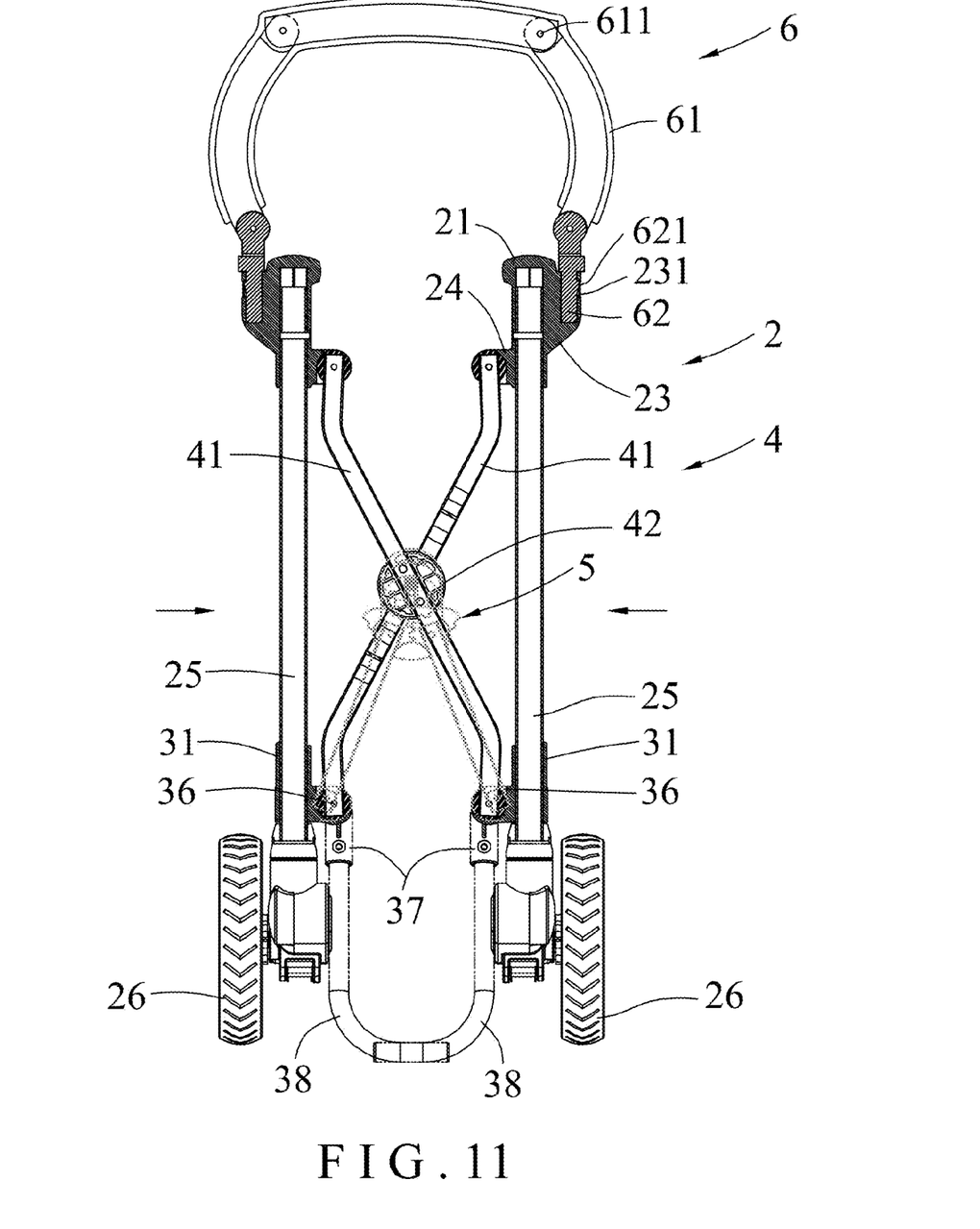
FIG. 11 is a schematic operational view of the stroller as shown in FIG. 6.
Figure 12:
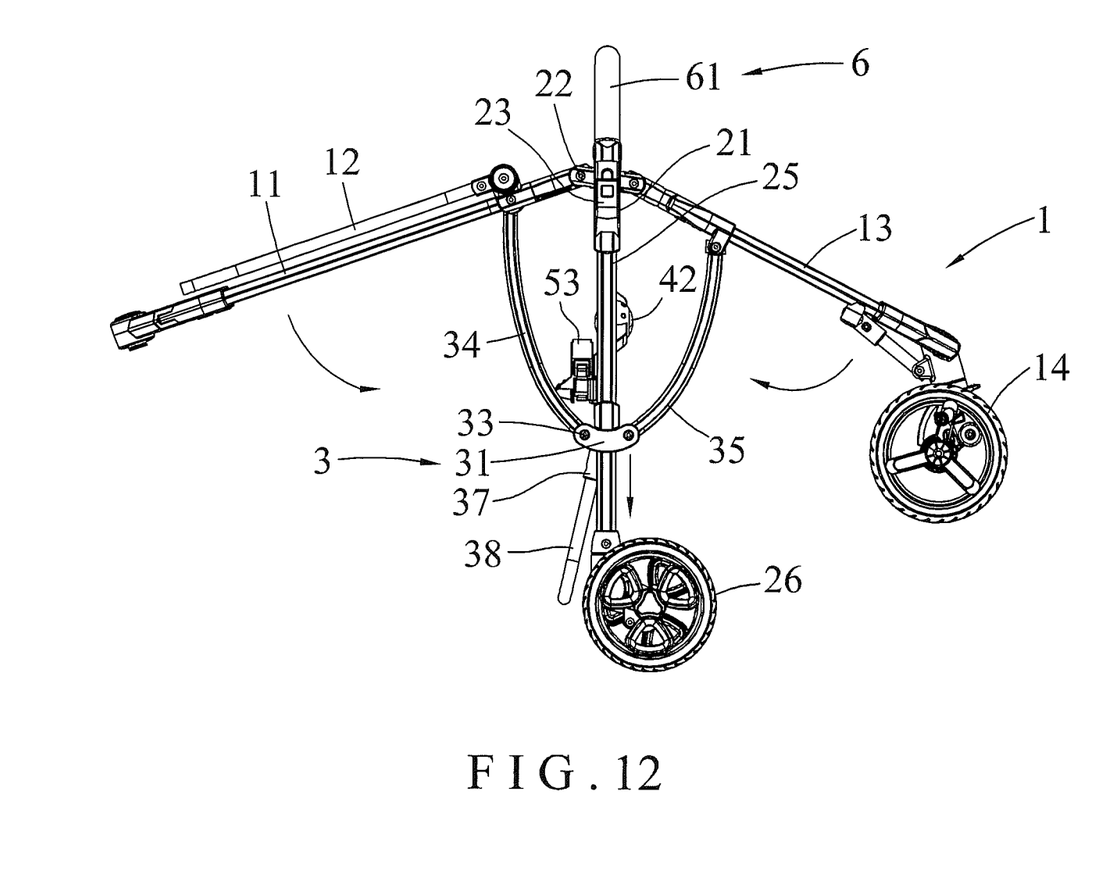
FIG. 12 is a schematic side operational view of the stroller as shown in FIG. 1.
Figure 13:
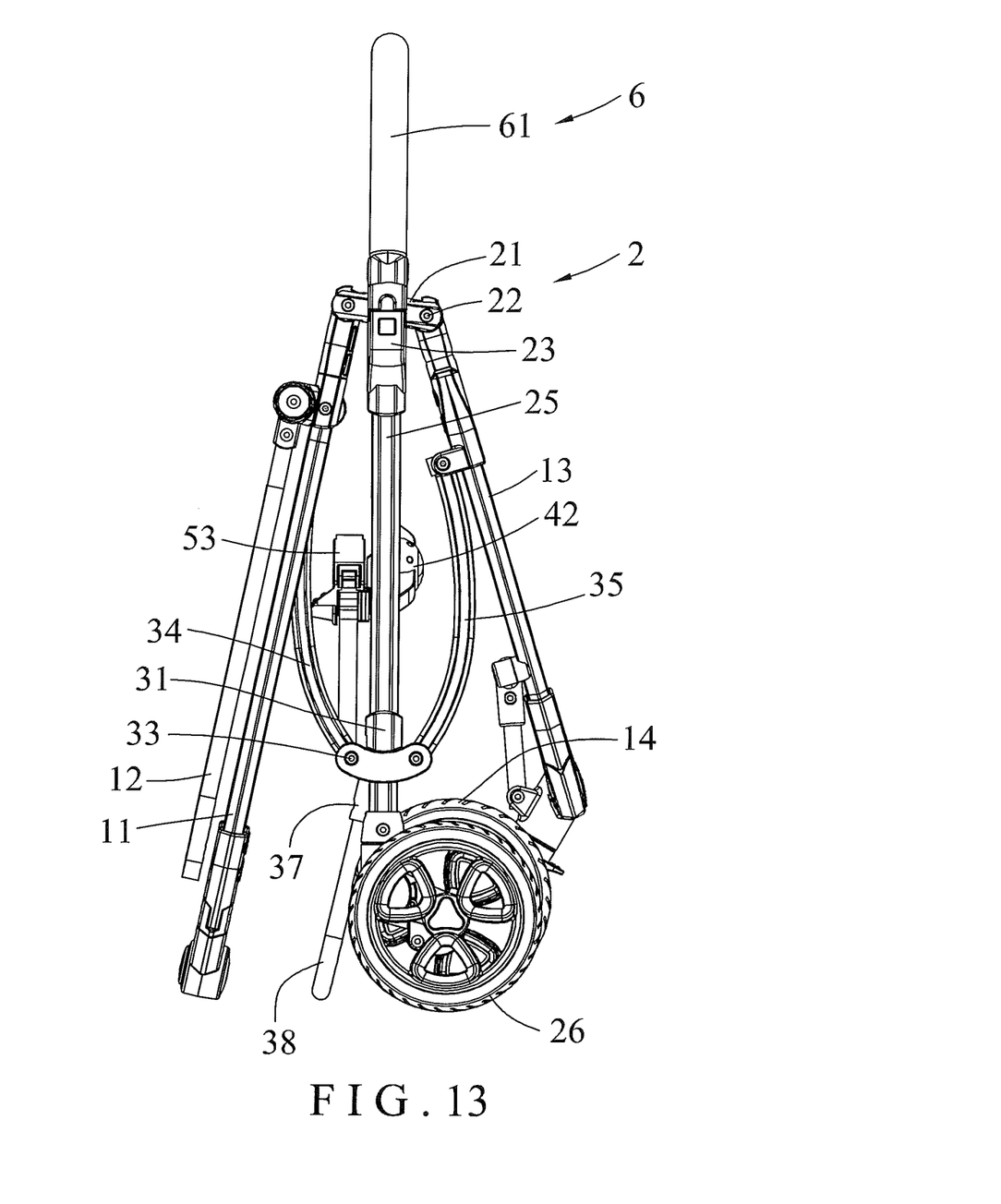
FIG. 13 is a schematic side operational view of the stroller as shown in FIG. 12.

In operation, referring to FIGS. 9-13 with reference to FIGS. 1-7, when the control cover 53 is pulled upward to compress the compression spring 52, the first pins 54 are moved upward and are detached from the positioning groove 561 of each of the positioning protrusions 56 as shown in FIG. 9 so as to unlock the folding bars 55 so that can be moved freely. Then, the drive plate 514 of the folding base 51 is pulled upward to move the folding bars 55 upward so that the folding bars 55 are pivoted upward about the engaging teeth 57 of the positioning protrusions 56 as shown in FIG. 10. In such a manner, the folding bars 55 are pivoted and moved toward each other to draw and contract the linking units 3 and the support units 2 so that the linking units 3 are moved toward each other, and the support units 2 are also moved toward each other as shown in FIG. 11. At this time, when the linking units 3 and the support units 2 are contracted inward, the upper frame 11 is contracted inward to bend the bendable joints 111, the lower frame 13 is contracted inward to bend the bendable joints 131, and the handle 61 is contracted inward to bend the bendable joints 611. In addition, the oblique levers 41 of the cross connection unit 4 are moved toward each other so that the cross connection unit 4 is contracted inward. At this time, the connecting block 31 of each of the linking units 3 is driven by the respective oblique lever 41 of the cross connection unit 4 and moved downward on the rear leg 25 of the respective support unit 2 as shown in FIG. 11, so that the upper curved lever 34 of each of the linking units 3 is driven by the connecting block 31 to pull downward the upper frame 11 of the outer frame unit 1, and the lower curved lever 35 of each of the linking units 3 is driven by the connecting block 31 to pull downward the lower frame 13 of the outer frame unit 1. In such a manner, the upper frame 11 of the outer frame unit 1 is pivoted and moved downward relative to the connecting piece 21 of each of the support units 2, and the lower frame 13 of the outer frame unit 1 is also pivoted and moved downward relative to the connecting piece 21 of each of the support units 2, so that the upper frame 11 and the lower frame 13 of the outer frame unit 1 are moved toward each other as shown in FIG. 12 so as to fold the stroller as shown in FIG. 13. When the stroller is folded, the rear wheel 26 of each of the support units 2 and the support bar 38 of each of the linking units 3 abut the ground so that the stroller is supported exactly and stably.

Accordingly, the handle unit 6 protrudes outward after the stroller is folded to facilitate the user holding and carrying the folded stroller. In addition, the upper frame 11 and the lower frame 13 of the outer frame unit 1 are collapsed and juxtaposed after the stroller is folded to reduce the height of the folded stroller. Further, the user only needs to pull the control cover 53 so as to contract and fold the stroller so that the stroller is collapsed easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A stroller comprising:
   an outer frame unit;
   two support units connected with the outer frame unit;
   two linking units connected with the outer frame unit and the support units;
   a cross connection unit mounted between the support units and the linking units; and
   a positioning and folding unit mounted between the support units;
   wherein:
   each of the support units includes:
   a connecting piece;
   a rear leg having a first end mounted on the connecting piece; and
   a rear wheel mounted on a second end of the rear leg;
   the connecting piece of each of the support units is provided with two first connecting grooves and a second connecting groove;
   the outer frame unit includes:
   an upper frame having two opposite ends each pivotally connected with the respective first connecting groove of each of the support units;
   a lower frame having two opposite ends each pivotally connected with the respective first connecting groove of each of the support units;
   a side frame pivotally connected with the upper frame; and
   a front wheel mounted on the lower frame;
   each of the linking units includes a connecting block mounted on the rear leg of the respective support unit;
   an upper curved lever mounted between the connecting block and the upper frame of the outer frame unit;
   a lower curved lever mounted between the connecting block and the lower frame of the outer frame unit; and a support bar connected with the connecting block;

the connecting block of each of the linking units is provided with a mounting hole, two first connecting recesses, a second connecting recess and a connecting portion;

the mounting hole of each of the linking units is slidably mounted on the rear leg of the respective support unit;

the upper curved lever of each of the linking units has a first end pivotally connected with the respective first connecting recess of the connecting block and a second end pivotally connected with the respective end of the upper frame of the outer frame unit;

the lower curved lever of each of the linking units has a first end pivotally connected with the respective first connecting recess of the connecting block and a second end pivotally connected with the respective end of the lower frame of the outer frame unit;

the support bar of each of the linking units is connected with the connecting portion of the connecting block;

the cross connection unit includes:

two oblique levers intersecting each other; and two rotation members each mounted on the respective oblique lever;

the rotation members of the cross connection unit are pivotally connected with each other;

each of the oblique levers of the cross connection unit has a first end pivotally connected with the second connecting groove of the respective support unit and a second end pivotally connected with the second connecting recess of the respective linking unit;

the positioning and folding unit includes a folding base, a compression spring, a control cover, two first pins, a second pin, two folding bars, and two positioning protrusions;

the folding base of the positioning and folding unit is provided with a receiving chamber, two elongate slots and a mounting channel;

the control cover of the positioning and folding unit is movably mounted on the folding base;

each of the first pins of the positioning and folding unit is extended through the control cover and is slidably mounted in the respective elongate slot of the folding base;

the second pin of the positioning and folding unit is extended through the control cover and is slidably mounted in the receiving chamber of the folding base;

the compression spring of the positioning and folding unit is mounted in the receiving chamber of the folding base and is biased between the folding base and the second pin;

each of the folding bars of the positioning and folding unit has a first end pivotally mounted in the mounting channel of the folding base and a second end pivotally connected with the connecting block of the respective linking unit;

each of the positioning protrusions of the positioning and folding unit is formed on the first end of the respective folding bar and is provided with a positioning groove and a plurality of engaging teeth;

the positioning groove of each of the positioning protrusions is detachably locked onto the respective first pin; and the engaging teeth of the positioning protrusions mesh with each other.

2. The stroller of claim 1, wherein:

the connecting piece of each of the support units has a side provided with a socket;

the stroller further comprises:

a handle unit connected with the support units;

the handle unit includes:

a handle; and two plugs mounted on two opposite ends of the handle; and each of the plugs of the handle unit is inserted into the socket of the respective support unit.

3. The stroller of claim 2, wherein the socket of each of the support units has a side provided with a locking hole, and each of the plugs of the handle unit has a side provided with an elastic locking boss detachably locked in the locking hole of the respective support unit.

4. The stroller of claim 2, wherein the upper frame of the outer frame unit is provided with two bendable joints, the lower frame of the outer frame unit is provided with two bendable joints, and the handle of the handle unit has a substantially inverted U-shaped profile and is provided with two bendable joints.

5. The stroller of claim 1, further comprising:

a seat enclosure mounted on the outer frame unit and located between the upper frame, the side frame and the lower frame.

6. The stroller of claim 1, further comprising:

a placement basket mounted between the linking units and connected with the lower curved lever and the support bar.

7. The stroller of claim 1, wherein the folding base of the positioning and folding unit has a side provided with a drive plate located beside the mounting channel.

* * * * *